United States Patent [19]

Gabbert et al.

[11] Patent Number: 4,590,244

[45] Date of Patent: May 20, 1986

[54] ACID HALIDE FUNCTIONAL MATERIALS

[75] Inventors: James D. Gabbert, St. Louis; Albert Y. Garner, Manchester; Ross M. Hedrick, St. Louis, all of Mo.

[73] Assignee: Monsanto Company, St. Louis, Mo.

[21] Appl. No.: 467,621

[22] Filed: Feb. 18, 1983

Related U.S. Application Data

[63] Continuation-in-part of Ser. No. 374,808, May 4, 1982, abandoned, which is a continuation of Ser. No. 274,325, Jun. 16, 1981, abandoned.

[51] Int. Cl.$^4$ .............................................. C08F 8/14
[52] U.S. Cl. ........................... 525/332.3; 525/359.4; 525/408; 525/437; 525/447; 525/474; 525/523; 560/83; 560/95; 560/91; 560/192; 560/198; 560/201
[58] Field of Search ..................... 525/408, 523, 332.3, 525/432, 359.4; 560/91, 95, 198, 83, 192, 201

[56] References Cited

U.S. PATENT DOCUMENTS

| | | | |
|---|---|---|---|
| Re. 30,371 | 8/1980 | Hedrick et al. | 528/312 |
| 2,652,424 | 9/1953 | DeGroote | 560/198 |
| 2,679,517 | 5/1954 | DeGroote | 560/198 |
| 2,682,526 | 6/1954 | Flory | 528/289 |
| 3,044,987 | 7/1962 | Schaefgen et al. | 525/408 |
| 3,657,385 | 4/1972 | Matzner | 525/534 |
| 3,770,849 | 11/1973 | Matzner et al. | 525/184 |
| 4,031,164 | 6/1977 | Hedrick et al. | 528/275 |
| 4,038,470 | 7/1977 | Stehlicek et al. | 525/342 |

FOREIGN PATENT DOCUMENTS

| | | |
|---|---|---|
| 2322165 | 3/1977 | France . |
| 662682 | 12/1951 | United Kingdom . |
| 1067153 | 5/1967 | United Kingdom . |
| 1170300 | 11/1969 | United Kingdom ............... 525/408 |

*Primary Examiner*—Wilbert J. Briggs, Sr.
*Attorney, Agent, or Firm*—R. Bruce Blance; Nancy J. Linck; William J. Farrington

[57] ABSTRACT

A composition containing acid halide functional materials, which are useful in the preparation of nylon block polymers, selected from the group consisting of:

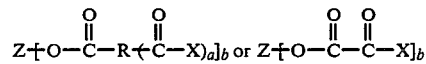

wherein,
X is a halogen;
a is an integer equal to 1, 2 or 3;
b is an integer equal to 2 or more;
R is a di- or a poly-valent group selected from hydrocarbon groups and hydrocarbon groups containing ether linkages;
Z is a segment of: (1) a polyether; (2) a polyester containing polyether polyester hydrocarbon segments, (3) a hydrocarbon; (4) a polysiloxane; or (5) combinations thereof.

15 Claims, No Drawings

ACID HALIDE FUNCTIONAL MATERIALS

RELATED REFERENCES

This application is a continuation-in-part of U.S. patent application Ser. No. 374,808 filed May 4, 1982, now abandoned which is a continuation of Ser. No. 274,325 filed June 16, 1981, now abandoned.

BACKGROUND OF THE INVENTION

1. Field of the Invention

This invention relates to acid halide functional materials obtained by the reaction of a hydroxyl-containing material with an acid halides which has di- or multi-halide functionality. More particularly, this invention relates to acid halide functional materials and compositions containing the same which can be employed in the preparation of nylon block polymers.

2. Description of the Prior Art

Polymers containing polyamide segments and segments of another material have been disclosed in the art and are herein referred to as "nylon block polymers". A combination of polyamide segments and segments of another polymeric material allows for the obtaining of block polymers with unique combinations of properties. The properties can be varied by varying the polyamide and/or other polymeric segments in the block polymer. Such block polymers have been found particularly suitable for use as fibers, fabrics, films and molding resins.

In U.S. Pat. Nos. 4,031,164, issued June 21, 1977, and 4,223,112, issued Sept. 16, 1980, both to Hedrick and Gabbert, there are taught nylon block polymers containing nylon segments derived from lactam monomers and other polymeric blocks derived from polyols. Polyacyl lactams provide linkages for blocks in the nylon block polymers taught in Hedrick and Gabbert. Molded articles having a unique combination of properties can be made from the nylon block polymers taught therein.

It is taught in the aforementioned Hedrick and Gabbert patents that the preparation of the block polymers taught therein involves mixing together lactam monomer, polyol, lactam polymerization catalyst and the polyacyl lactam. The process described in the above referred to Hedrick and Gabbert patents for making nylon block copolymers typically results in the formation of some polyamide homolog due to the polyacyl lactams which are acyllactam containing materials, as defined hereinafter, reacting solely with lactam monomer. It is preferable to minimize any homolog since it generally causes detrimental effects such as the reduction of molding impact properties of the nylon block copolymer. The catalytic process for imide-alcohol condensation taught by Hedrick and Gabbert in U.S. Pat. No. Re 30,371, reissued Aug. 12, 1980, can be employed in the preparation of the Hedrick and Gabbert nylon block polymers. It should be noted that by this process, the reaction paths shown in columns 3 and 4 of U.S. Pat. No. 2,682,526 issued June 29, 1954, to Flory occur, thus resulting in the preparation of multiple acyl-lactam functional material (hereinafter defined) species. Furthermore, reacting a polyol and polyacyl lactam in accordance with this process results in a mixture containing residual catalyst that should be removed or inactivated to reduce the potential difficulties in any subsequent preparation of nylon block copolymer moldings from said mixture.

In U.S. Pat. No. 3,657,385, issued Apr. 18, 1972 to Matzner et al, there are disclosed block polymers prepared from lactam monomer and polyarylene polyethers by anionically polymerizing the lactam monomer with a catalyst-initiator system which comprises, as the initiator or activator, one or more of certain polyarylene polyethers. The particular polyarylene polyether initiators disclosed as useful have terminal groups selected from various specified groups.

Alternative methods for the preparation of nylon block polymers, for example, of the type taught in the aforementioned Hedrick and Gabbert patents, would be of interest to those skilled in the art and is an object of the present invention. Another object of this invention is to provide new materials useful as intermediates in the preparation of nylon block polymers. These and other objects will become apparent from the following detailed description of the present invention.

SUMMARY OF THE INVENTION

In accordance with the present invention, there are provided acid halid functional materials selected from the group consisting of:

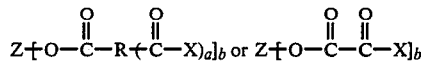

wherein,
X is a halogen;
a is an integer equal to 1, 2 or 3;
b is an integer equal to 2 or more;
R is a di- or a poly- valent group selected from hydrocarbon groups and hydrocarbon groups containing ether linkages;
Z is a segment of: (1) a polyether; (2) a polyester containing polyether or polymeric hydrocarbon segments,
(3) a hydrocarbon;
(4) a polysiloxane; or
(5) combinations thereof.

DETAILED DESCRIPTION OF THE INVENTION

The acid halide functional materials taught herein can be prepared by reacting a hydroxyl-containing material with an acid halide functional material containing two or more carboxylic acid halide groups (i.e.

halogen groups). In the reaction mixture the equivalents of acid halide groups should be maintained in excess of the hydroxyl groups. In this reaction the acid halide material attaches to the hydroxyl sites in the hydroxyl-containing material through ester linkages. By-product hydrogen halide results from the hydrogen and halogen which are displaced. An example of this reaction can be depicted as follows:

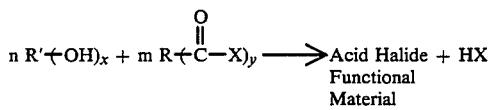

wherein $my \leq nx + 2$

In the above reaction $R'(OH)_x$ is a material containing two or more hydroxyl groups, i.e. x is at least 2, preferably 2 to 4. This material can be a diol, triol or a material having higher hydroxyl content. The R' group in the hydroxyl-containing material can be a hydrocarbon (preferably having a molecular weight of at least 100), a polyether or a polysiloxane group.

It is to be understood that, unless otherwise stated, reference herein to "molecular weight" for polymers or polymeric segments means number average molecular weight which can be determined by methods well known in the art, e.g. gel phase chromatography.

Reference herein to "polysiloxane" group or segment herein means a group or segment containing at least 50 percent by weight of one or more

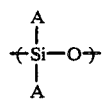

(a siloxane unit) repeat units. In this structure for siloxane units A can be methyl or phenyl. Polysiloxane groups or segments would typically have present other groups, for example, ether groups with residues of lower alkyls such as ethane, such groups typically being terminating groups on a chain of repeating siloxane units. These other groups may comprise up to 50 weight percent of the polysiloxane group, preferably less than 30 weight percent.

Preferred R' groups are hydrocarbon and polyether groups. Exemplary hydrocarbon groups are alkylene in the case of diols such as ethylene glycol and polymeric hydrocarbons such as a segment of polybutadiene which can be functionalized to contain two or more hydroxyl groups. A polyoxypropylene segment which can be functionalized to contain two or more hydroxyl groups is an example of a polyether group.

Exemplary hydroxyl-containing materials useful in the above depicted reaction are ethylene glycol, propylene glycol, poly(oxybutylene) glycol, poly(oxyethylene) glycol, poly(oxypropylene) diol, poly(oxypropylene) triol, poly(oxypropylene) tetrol, polybutadiene diol, hydroxyl-functionalized polydimethylsiloxanes and combinations thereof, for example, block polymers of poly(oxypropylene) and poly(oxyethylene) functionalized with two or more hydroxyl groups.

The acid halide material in the above-depicted reaction, i.e.

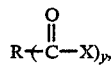

contains two or more acid halide groups, i.e. y is greater than 1, generally 2, 3 or 4, preferably 2. The R group in this acid halide material is a hydrocarbon group or a hydrocarbon group containing ether linkages (generally up to 20 weight percent ether oxygen). Preferred are hydrocarbon groups, most preferably those containing 1 to 12 carbon atoms. Even more preferred R groups are hydrocarbon groups or hydrocarbon groups having ether linkages either of which provide at least three successively bonded elementary atoms between any two carbonyl groups bonded to R. Examples of preferred acid halides are sebacic acid chloride and phthalic acid chloride wherein the carbonyl groups are attached thereto either in the meta- or para- position, i.e. isophthaloyl and terephthaloyl acid chloride, respectively.

In place of the acid halide depicted in the above reaction there may be employed acid halides having the structure

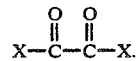

In the above depicted structure X is halogen.

In yet another embodiment of the teachings herein, in place of the acid halides described above as useful in the above reaction, there may be employed acid halides having the structure

or even phosphorus or sulfur-containing acid halides of the structures

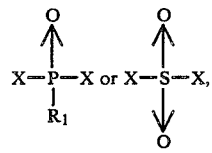

with X as defined hereinbefore, and $R_1$ being an alkyl, aryl, aralkyl, halogen, alkyloxy, aryloxy or aralkyloxy group.

Exemplary acid halides which may be employed in the above reaction are adipoyl chloride, terephthaloyl chloride, trimesoyl chloride, trimellitic chloride, oxalyl chloride, isophthaloyl chloride, pyromellitoyl chloride, pimeloyl chloride, glutaryl chloride, benzophenone tetracarboxylic acid chloride, oxydiacetyl chloride, oxydibenzoyl chloride, sulfuryl chloride, phosphorus oxychloride, sebacic acid chloride, azelaic acid chloride, alkyl-, aryl-, and aralkylphosphorodichloridates, alkyl-, aryl- and aralkylphosphonodichloridates.

It is to be understood that numbers designating the amount of functional groups on materials described herein (e.g. the numbers x, y and b above) would be integers for a single molecule of the material. However, many of such materials, particularly polymeric materials, generally exist in mixtures or compositions containing species having varying amounts of functionality, some species possibly having an amount higher or lower than desired. For such mixtures or compositions, a number designating the amount of functional groups would represent an average of the different species and thus would not necessarily be an integer.

Essentially all of the hydroxyl groups in the hydroxyl-containing starting material are converted in the above described reaction. By providing the acid halide groups in excess of the hydroxyl groups the resulting reaction product is functionalized with acid halide groups.

The above reaction is preferably carried out in the presence of a non-interfering solvent, e.g. cyclohexane, toluene, tetrahydrofuran, or acetone to facilitate removal of the hydrogen halide which is generated. It is also possible for the reaction to proceed without the presence of a solvent with the hydrogen halide being driven off with heat, vacuum, nitrogen sweeping or the like. When a solvent is employed in the reaction, a basic material which acts as an acid scavenger to produce a by-product which is insoluble in the solvent may be employed as a convenient means for removing the hydrogen halide. Well known acid scavengers such as tertiary amines may be employed. The above reaction can be carried out under essentially ambient conditions and will proceed even more rapidly at higher temperatures, e.g. 30° to 150° C. Precise temperature for the reaction may depend upon the solvent employed. If a solvent is employed it can be removed after tne reaction by distillation.

The above-described procedure results in reaction between a hydroxyl-group of the hydroxyl-containing material and an acid halide group of the acid halide material. The following acid halide functionalized materials can thus be prepared:

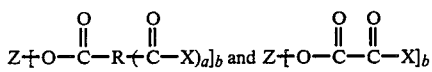

wherein,

X is halogen;

a is an integer equal to 1, 2 or 3;

b is an integer equal to 2 or more;

R is a di- or poly- valent group selected from hydrocarbon groups and hydrocarbon groups containing ether linkages;

Z is a segment of (1) a polyester, provided said polyester is not comprised solely of poly(tetramethylene terephthalate) or poly(tetramethylene isophthalate); (2) a polyether; (3) a hydrocarbon; or (4) a polysiloxane.

The following acid halide-functionalized materials representing yet another embodiment of the teachings herein can also be prepared in accordance with the above-described procedure:

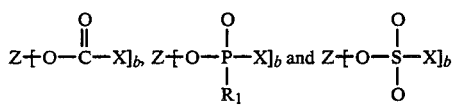

wherein, $R_1$ is an alkyl, aryl, aralkyl, halogen, alkyloxy, aryloxy, or aralkyloxy group;

X and b are as defined hereinbefore; and

Z is a segment of (1) a polyester; (2) a polyether, provided said polyether is not solely polyarylene polyether; (3) a hydrocarbon; or (4) a polysiloxane.

The Z segment in the above Formulae I(a) and I(b) is a segment of (1) a polyester; (2) a polyether; (3) a hydrocarbon; or (4) a polysiloxane with certain provisos recited hereinbefore. The Z segment for the reaction product depicted by Formulae I(a) and I(b) can be the same as an R' group of a hydroxylfunctional material employed in the reaction described hereinbefore. Alternatively, the Z segment can be a segment containing two or more residues of the starting hydroxyl-containing material linked together with a residue(s) of the starting acid halide material.

Reference herein to "acid halide functional materials" means compounds represented by formulas (I(a) and (b)).

It is to be understood that in connection with the description of Z segments or R' groups herein, reference to polymeric segments/groups embraces oligomeric segments/groups unless a specific usage precludes such interpretation. It is also to be understood that these segments/groups may be linear, branched or even star structures.

A Z segment which is a segment of a polyester could be derived from the reaction of an acid halide having di- or multi- halide functionality with a hydroxyl-containing material, the groups in the hydroxyl-containing material being linked together by the acid halide through polyester linkages. Exemplary hydroxyl-containing starting materials which may be employed in such a reaction are ethylene glycol, propylene glycol, polycaprolactone diol and polyol, and polybutadiene diol. Acid halides such as those exemplified hereinbefore may be employed. Those skilled in the art would recognize a wide variety of polyester segments which may represent Z in the above Formulae I(a) and I(b). In the embodiment represented by Formula I(a) there are excluded polyester segments comprised solely of poly(tetramethylene terephthalate) or poly(tetramethylene isophthalate).

It should be understood that a Z segment which is a segment of a polyester would in fact contain smaller segments which fall within the other categories of possible Z segments, for example, hydrocarbon or polyether segments. As an example, a Z segment which is a segment of a polyester can be derived from a hydroxyl-containing material containing a polyether group and an acid halide material whereby two or more of the polyether groups become linked together by the acid halide material through ester linkages. The hydroxyl-containing material may be derived from a diol, triol, or polyol. A specific example of such would be the reaction product of poly(oxypropylene) triol and terephthaloyl chloride wherein a residue of the terephthaloyl chloride provides a linkage between two units derived from the triol. Such polyester Z segments could be more specifically described as poly(ether-ester) segments which are a preferred type of polyester segment within the scope of the teachings herein.

Similarly, other preferred polyester Z segments are those which are the reaction product of a diol or triol which contains polymeric hydrocarbon units with an acid halide material whereby two or more of the polymeric hydrocarbon units become linked together by the acid halide material. An example of such is the reaction product of a polybutadiene diol with terephthaloyl chloride wherein two or more polybutadiene segments are linked together by the terephthaloyl chloride through ester linkages.

Polyester segments which may represent Z can vary widely in size but generally have molecular weights of at least 500. Preferred molecular weights for these segments are from about 1,000 to about 25,000. Preferred types of polyesters which contain polyether or polymeric hydrocarbon segments generally contain these segments at molecular weights of from about 500 to about 4,000.

Furthermore, as will be discussed below, the properties of a nylon block copolymer prepared from an acid halide functionalized material wherein the Z segment is a polyester exhibits unexpected results when the polyester contains polyether segments having a minimum molecular weight of about 2,000.

A segment of a polyether is a preferred Z segment in the present invention. Such can be derived from a hydroxyl-containing material which contains a polyether segment. Such hydroxyl-containing materials which are preferred include poly(oxyethylene) glycol; poly(oxybutylene) glycol; poly(oxypropylene) diol, triol, and tetrol; and block polymers of poly(oxypropylene) and poly(oxyethylene) functionalized with two or more hydroxyl groups.

The Z polyether segments generally have a molecular weight of at least 500, preferably at least 1,000, and more preferably at least about 2,000. Preferred molecular weights are from about 1,000 to about 25,000, more preferred 2,000-25,000. Even more preferred are molecular weights from about 2,000 to about 4,000 for diol derivatives, from about 3,000 to about 12,000 for triol derivatives and from about 4,000 to about 16,000 for tetrol derivatives.

It has been determined, as will be further discussed below, that the properties of a nylon block copolymer prepared from an acid halide functionalized material wherein the Z segment is a polyether can be significantly influenced by the molecular weight of the segment and that certain preferred molecular weights result in unexpected beneficial results.

It has further been determined that a minimal amount of cross-linking in the prepared nylon block copolymer, which occurs when the average functionality of a composition of acid halide functional materials is greater than two, also results in unexpectedly improved properties. These features will be discussed and exemplified more fully below.

In the embodiment represented by formulae I(b) are excluded Z segments which are solely polyarylene polyether, i.e. segments consisting essentially only of units of the Formula [O-AR-O-AR] wherein AR is a benzenoid residue (mono-, di- or polynuclear) bonded to the ether oxygens through aromatic carbons.

A Z segment which is a segment of a hydrocarbon can be derived from a hydroxyl-containing material which contains a hydrocarbon segment. The size of the hydrocarbon group can vary widely in size from alkylene groups of low molecular weight to polymeric hydrocarbons of substantially higher molecular weight. If Z is a low molecular weight hydrocarbon the acid halide-functional materials of Formulae I(a) and I(b) could be employed to join nylon blocks together as described hereinafter. The resulting linkage would introduce the low molecular weight hydrocarbon as an additional block in the resulting nylon block polymer. Examples of low molecular weight hydrocarbon (Z) segments would be the $C_2$ to $C_7$ alkylenes.

Preferred Z segments in the present invention are segments of polymeric hydrocarbons. By "polymeric hydrocarbon segment" herein is meant a hydrocarbon segment of molecular weight of at least about 100 and containing two or more repeat units. Exemplary hydroxyl-containing materials which can be employed to provide Z segments which are segments of a polymeric hydrocarbon are alkylene ($C_8$ and above) glycols and polybutadiene diols, triols, tetrols and even higher polyols. Segments which are polymeric hydrocarbons preferably have a molecular weight of at least 500, even more preferably from about 1,000 to about 25,000. Most preferred are molecular weights from about 1,000 to about 4,000 for diol derivatives, from about 3,000 to about 12,000 for triol derivatives, and from about 4,000 to about 16,000 for tetrol derivatives.

The Z segment may also be a segment of a polysiloxane, such being defined hereinbefore. Such a Z segment could be derived from a hydroxyl-containing material having a polysiloxane segment. Exemplary hydroxyl-containing materials of this type are polydimethylsiloxanes containing two or more hydroxyl functional groups. Polysiloxane segments would generally have a molecular weight of at least 500, preferably at least 1,000. More preferably the molecular weight of such segments would be from about 1,000 to about 25,000.

It should be recognized that the Z segment in the above Formulae may contain a combination of the just described polyester, polyether, hydrocarbon and polysiloxane segments. As discussed hereinbefore preferred polyester segments contain polyether or polyhydrocarbon segments. Also as discussed hereinbefore, polysiloxane segments as defined herein typically contain groups other than siloxane units. It is recognized that other combinations of polyester, polyether, hydrocarbon and polysiloxane segments are possible, and such are contemplated equivalents for use as Z segments in the present invention.

In the above Formulae I(a) and I(b), X is a halogen, preferably chlorine or bromine, most preferably chlorine. The integer a in Formulae I(a) is preferably 1 which would be the case when a diacid halide of the structure

is employed in the reaction described above. The integer b in Formulae I(a) and I(b) is at least 2, preferably 2 to 20, most preferably 2 to about 4. R in the above Formulae I(a) is a di- or poly- valent hydrocarbon group (valency equal to a+1) and would correspond to the R group in the acid halide starting material in the above described reaction scheme. $R_1$ in Formulae I(b) is an alkyl, aryl, aralkyl halogen, alkyloxy, aryloxy, or aralkyloxy group.

Acid halide functional materials of the present teachings which are preferred are those represented by the formula:

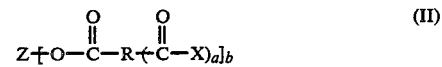
(II)

wherein X is chlorine or bromine, b is 2 to about 4 and R and Z are as defined hereinabove. As discussed hereinabove, a further preferred form for acid halide functional materials is wherein the R groups provide at least three successively bonded elementary atoms between any two carbonyl groups bonded to R. Examples of such R groups are those derived from adipoyl halide, isophthaloyl halide and terephthaloyl halide.

The acid halide functional materials taught herein have been found to be useful in the preparation of nylon block polymers. It has been found that the acid halide functional materials of the present invention can be reacted with a lactam monomer to result in an acyllactam functional material which can further be reacted with lactam monomer to form a nylon block polymer. For example, the acid halide functional materials depicted in Formulae I(a) above can be reacted with a lactam monomer containing from about 4 to about 12 carbon atoms, to produce the following acyllactam functional materials:

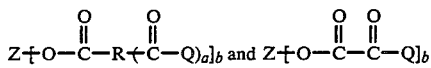

(III(a))

wherein,
Q is

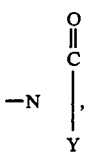

with Y=$C_3$–$C_{11}$ alkylene; and a, b, R and Z are as defined above for Formula I(a).

Similarly, the acid halide functional materials depicted in Formulae I(b) above can be reacted with lactam monomer to produce the following acyllactam functional materials:

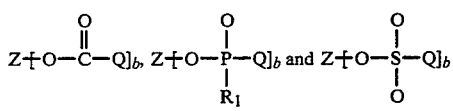

(III(b))

wherein,
Q is

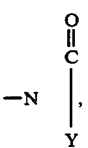

with Y=$C_3$–$C_{11}$ alkylene; and b, $R_1$ and Z are as defined above for Formula I(b), with $R_1$ also possibly being Q.

Reference herein to "acyllactam functional materials" means compounds having acyllactam groups wherein (1) an ether oxygen is linked to a diacid halide residue as generally shown in formulas III(a) and III(b) and/or (2) wherein a lactam residue (—N-H—Y—CO—) is positioned between the ether oxygen and the acid halide residue. The acyllactam functional materials of the present invention are those shown in formulas III(a) and III(b). Reference herein to "acyllactam containing materials" includes acyllactam functional materials as defined above and also compounds which do not contain an ether oxygen such as certain polyacyl lactams described in the above referred to Hedrick et al patents.

The reaction of acid halide functional materials with lactam monomer to prepare the acyllactam functional materials of Formulae III(a) and III(b) would typically be carried out in the presence of a solvent, e.g., cyclohexane, toluene, acetone or excess lactam monomer, and an acid scavenger to facilitate the removal of hydrogen halide generated in the reaction. The reaction may also be carried out without the presence of a solvent. The previous discussion regarding the use of solvent and reaction conditions in connection with the reaction of hydroxyl-containing material with acid halide functional material equally applies here. In an alternative method the acyllactam functional materials can be prepared under similar conditions from a reaction mixture containing a hydroxyl-containing material, an acid halide functional material and lactam monomer, without ever isolating the intermediate acid halide functional material (Formulae I(a) or I(b)) which is formed. The preparation of the acyllactam functional materials of the present invention by a method without employing the basic polymerization catalyst generally taught by Hedrick and Gabbert as discussed hereinbefore eliminates the potential for unwanted catalytic reaction between the acyllactam functional material and lactam monomer and there is no necessity to carry out an additional step of deactivating or removing residual catalyst. A quantitative reaction is preferred to displace essentially all of the halogens in the acid halide of Formulae I(a) or I(b) with lactam groups.

The acyllactam functional polymer of Formulae III(a) and (b) above can then be reacted with additional lactam monomer to prepare a nylon block polymer. An advantage of preparing nylon block copolymers from the acyllactam functional materials of the present invention is the lessened potential of forming polyamide homologs which may be associated with prior art methods. The polyamide homolog typically results from the reaction between lactam monomer and acyllactam-containing materials such as bisimides. Additional hydroxyl-containing material may be included in the reaction mixture but the acyllactam groups should be present in excess of the hydroxyl groups in the mixture. The hydroxyl-containing material will become incorporated in the nylon block polymer. The materials should be intimately mixed. Antioxidant is generally included in the reaction mix. This reaction is generally carried out in the presence of a suitable basic catalyst for the anionic polymerization of lactam, preferably caprolactam magnesium bromide or chloride. A small amount of catalyst may be effective, e.g. a fraction of one mole percent of the lactam monomer to be polymerized, but higher amounts, e.g. from 1 to 20 mole percent, or higher, based on the lactam monomer may be employed. The lactam monomers generally contain 4 to about 12 carbon atoms, preferably 6 to about 12. Caprolactam (which herein means e -caprolactam) is particularly preferred. Corresponding residues of such preferred lactam monomers are preferred for Q in Formulae III(a) and (b). In relatively short reaction times, e.g., less than 10 minutes or even less than 30 seconds, and under moderate conditions, e.g. from about 70° C. to about 250° C., preferably about 120° C. to about 170° C., the formation of a nylon block polymer results. The lactam can polymerize at the acyllactam sites and also be inserted at ester and amide sites. Nylon block polymers disclosed in the aforementioned Hedrick and Gabbert patents can thus be prepared. The fast reaction time to form the nylon block polymers makes the materials disclosed herein particularly useful in reaction injection molding applications, with other related applications, such as in-mold coating of substrates, rotation molding, resin transfer molding, and pultrusion molding also contemplated.

The relative amounts of lactam monomer and acyllactam functional polymer employed in the preparation of nylon block polymer by the process described above can vary widely depending upon the nylon block polymer desired. The lactam monomer and acyllactam functional polymer can be present in proportions ranging up to 99 parts by weight of either component to 1 part by weight of the other. Preferred amounts are from about 60 to about 90 percent by weight lactam monomer and from about 10 to about 40 percent by weight acyllactam functional polymer. However, from about 40 to about 70 percent by weight acyllactam functional polymer can be employed to make elastomeric block polymers. Under typical reaction conditions the polymerization is essentially quantitative, i.e. essentially all of the lactam and acyllactam functional polymer is incorporated in the nylon block polymer.

In the preparation of nylon block polymers it may be desirable to conduct the polymerization reaction in the presence of one or more other materials conventionally incorporated in nylon block polymers. Such materials would include fillers, plasticizers, flame retardants, stabilizers, fibrous reinforcing agents such as asbestos and glass fiber, dyes and pigmenting materials. Such materials may be introduced in the materials of Formulae I(a), (b) or III(a), and (b), taught herein, or otherwise.

The following examples will illustrate the present invention in greater detail. These examples are for illustrative purposes only and are not to be construed as limiting the scope of the invention which would include various other modifications. Unless otherwise indicated herein, all parts, percentages, ratios and the like are by weight.

EXAMPLE 1

A. Preparation of Acid Halide Functional Material

A solution of 48.2 grams (0.049 equivalents) Pluracol GP-3030 (polyoxypropylene triol, Mol. Wt. about 3,000) in 40 cc. toluene was refluxed to remove essentially all water by azeotrope. The mixture was cooled to room temperature, and 9.45 grams (0.103 equivalents) of crude adiproyl chloride was added. The solution was heated to reflux. During reflux hydrogen chloride gas was evolved rapidly. The mixture was refluxed one hour.

This reaction resulted in the hydroxyl sites of the polyoxypropylene triol being functionalized by the adipyl chloride to form the tri (acid chloride) functional derivative.

B. Preparation of Acyllactam Functional Material

To the resulting reaction product prepared in A. above was added 169 milliliters (mls.) dry molten caprolactam. The mixture was refluxed. Reflux pot temperature rose to 185° C. Hydrogen chloride evolution occurred at a moderate rate. The course of reaction was monitored by periodic determination of residual acidity. After one and one-half hours reflux at 185° C., acidity was 0.077 milli-equivalents/gram (meq./gm.). The solution was cooled and was allowed to set overnight. An additional 45 mls. toluene was added and the solution again refluxed—this time at 140° pot temperature. After two hours additional reflux (total reflux time=three and one-half hours) acidity was 0.042 meq./gm. when titrated to phenolphthalein end point with 0.1 normal sodium hydroxide. Additional reflux period of three and one-half hours did not change this acidity.

This reaction resulted in the chlorine atoms in the product prepared in A. being displaced by caprolactam groups to form the tri(acyllactam) functional derivative.

C. Preparation of Nylon Block Polymer

To the reaction product prepared in B. above an additional 11.8 grams Pluracol GP-3030 were added. Toluene was stripped off under vacuum, and then 25 cc. caprolactam removed by distillation. The resulting solution was cooled to 75° C. and 84 mls. of 0.4 molar bromomagnesium caprolactam (in caprolactam) was injected under vacuum. The mixture was stirred vigorously for 20 seconds, the vacuum released to nitrogen and the mixture poured into a 130° C. Teflon-lined mold. The material was set into a firm polymer in two minutes. After an additional two minutes the polymer was removed from the mold and cut into specimens for physical testing. The resulting polymer was a nylon block copolymer which contained about 20% poly(oxypropylene) and which exhibited the following properties (determined in accordance with the procedures described hereinafter for Examples 29–51):

| Tensile Strength | 5960 (psi) 41 MPa |
| Tensile Elongation | 30% |
| Tear Strength | 1280 (pli) 224 × $10^3$ N/m |
| Flexural Modulus | 157,000 (psi) 1082.5 MPa |
| Notched Izod Impact | 6.6 (ft. lbs./in.). 352 J/m |

The following polyols and acid halides were employed in the preparation of additional acid halide functional polymers, acyllactam functional polymers and nylon block polymers:

TABLE A

| Polyols | |
|---|---|
| Designation | Description |
| Niax 11-34 (NIAX) | Ethylene Oxide capped poly(oxypropylene)triol (Molec. Wt. about 4,800). |
| Pluracol P-380 (P380) | Poly(oxypropylene)triol (Molec. Wt. about 6,760). |
| Pluracol GP 3030 (GP) | Poly(oxypropylene)triol (Molec. Wt. about 3,000). |
| Pluracol P494 (P494) | Poly(oxypropylene)tetrol (Molec. Wt. about 4,750). |
| Carbowax 4000 (CARB) | Poly(oxyethylene)diol (Molec. Wt. about 3,700). |
| R 45 M (R45) | Poly(butadiene)diol (Molec. Wt. about 2,800). |
| Polyol Mix (MIX) | 50/50 by mole mixture of Niax 11-34 and GP 3030. |
| Q4-3667 (Q4) | Silicone polycarbinol. |
| Tetrol 9000 (TET 9) | Ethylene Oxide capped poly(oxypropylene)tetrol (Molec. Wt. about 9,000). |
| Triol 8000 (TRI 8) | Ethylene Oxide capped poly(oxypropylene)triol (Molec. Wt. about 8,000). |

TABLE B

| ACID HALIDES | |
|---|---|
| | Designation |
| Terephthaloyl Chloride | TERE |
| Adipoyl Chloride | ADIP |
| Isophthaloyl Chloride | ISOP |
| ISOP/TERE Mixture (50/50 Wt. %) | ISO/TER |
| Oxydibenzoyl Chloride | OBC |
| Phenylphosphonyl Chloride | PPC |
| Sulfuryl Chloride | SC |
| Phosphorus Chloride | POC |
| Oxalyl Chloride | OXA |

EXAMPLE 2

Preparation of Acid Halide Functional Material

A solution of 96.0 grams (0.02 mole) of Niax 11-34 in 237 mls. of cyclohexane was dried by removing 27 mls. of the water azeotrope during a half-hour reflux period.

The solution was cooled to 21° C. and 12.18 grams (0.06 mole) of terephthaloyl chloride (TERE) were added with stirring. A solution of 6.08 grams (0.06 mole) of triethylamine in 20 milliliters of cyclohexane was added over 5 minutes. The temperature rose from 21° C. to 26° C., and a white precipitate formed. The solution was heated to reflux and was cooled immediately to 10° C. and filtered through "Celite". Removal of the solvent under vacuum at 80° C. left 102.48 grams of a yellow syrup. The IR spectrum showed ester and acid chloride carbonyl absorption at 1745 cm.$^{-1}$ and 1800 cm.$^{-1}$, respectively, and no hydroxyl absorption, demonstrating the formation of the desired acid halide functional polymer.

EXAMPLE 3

A. Preparation of Acid Halide Functional Material

A solution containing 48.0 grams (0.01 mole) of Niax 11-34 in 77 mls. of cyclohexane was dried by removing 27 mls. of the water azeotrope during a half-hour reflux. The polyol solution was cooled to 50° C., and 6.09 grams (0.03 mole) of solid terephthaloyl chloride (TERE) were added with stirring. A solution of 3.04 grams (0.03 mole) of dry triethylamine in 20 mls. of cyclohexane was added over a period of 10 minutes. The temperature rose from 47.5° C. to 49° C. The resulting creamy slurry was stirred and heated at reflux for a half-hour to complete formation of the acid halide functional polymer.

B. Preparation of Acyllactam Functional Material

The reaction mixture from A. above was cooled to 42° C. and 4.0 grams (0.035 mole) of solid caprolactam were added with stirring. A solution of 3.54 grams (0.035 mole) of triethylamine in 20 mls. of cyclohexane was added over a period of seven minutes. The temperature rose 42° C. to 53° C. An additional 60 mls. of cyclohexane were added, and the mixture was heated at reflux with stirring for a half-hour. Cooling to 11° C. and filtration through "Celite" left a clear, colorless filtrate. Removal of the solvent at 80° C. under vacuum for three hours yielded 52.26 grams of a clear, yellow syrup. The acidity of the resulting acyllactam functional polymeric material was 0.028 meq./gm.

EXAMPLE 4

Preparation of Acyllactam Functional Material

A solution of 96.0 grams (0.02 mole) of Niax 11-34 and 7.0 grams (0.062 mole) of caprolactam in 227 mls. of cyclohexane was dried by refluxing for an hour, while 27 mls. of the water azeotrope were removed. The solution was cooled to 15° C., and 12.18 grams (0.06 mole) of terephthaloyl chloride (TERE) were added with stirring. A solution of 12.66 grams (0.125 mole) of triethylamine in 40 mls. of cyclohexane was added over a five minute period. The temperature rose from 15° C. to 30° C., and a white precipitate formed. The mixture was heated to reflux and kept there for one hour; then, 1.5 grams of methanol were added and refluxing was continued for another hour. The mixture was cooled to 10° C. and was filtered through "Celite". Removal of the solvent under vacuum at 80° C. over three hours left 93.93 grams of an amber syrup. The acidity of the resulting acyllactam functional polymeric material was 0.032 meq./gm.

EXAMPLES 5-8

Additional Examples 5-8 were carried out substantially in accordance with previous Example 3 (A and B) or Example 4 except for the particular materials and amounts thereof which were employed. The type and amounts of materials and method of preparation (Ex. 3 or Ex. 4) for each of Examples 5-28 are shown in Table C. In some of the Examples run in accordance with Example 3, the reflux in Step B was extended beyond 30 minutes, up to 3 hours in some cases. Additionally, in some of the Examples run in accordance with Example 3 a small amount of methanol or of anhydrous sodium carbonate was added after 30 to 60 minutes of reflux in Step B for the purpose of adjusting the acidity of the final product. For some of the Examples run in accordance with Example 4 an equivalent amount of sodium carbonate was used instead of the methanol added during the reflux step. The acidity of the resulting acyllactam functional material was between about 0.028 and 0.3 meq./gm. for each of these examples.

TABLE C

| Example | Polyol (Moles) | Acid Halide (Moles) | Caprolactam, Moles | TEA, Moles | Method |
|---|---|---|---|---|---|
| 5 | NIAX (0.01) | TERE (0.03) | 0.031 | 0.06 | EX. 3 |
| 6 | GP (0.01) | TERE (0.03) | 0.035 | 0.065 | EX. 3 |
| 7 | NIAX (0.02) | TERE (0.06) | 0.062 | 0.125 | EX. 3 |
| 8 | GP (0.01) | TERE (0.03) | 0.035 | 0.065 | EX. 3 |
| 9 | NIAX (0.01) | ADIP (0.03) | 0.035 | 0.065 | EX. 3 |
| 10 | NIAX (0.03) | ISOP (0.06) | 0.062 | 0.125 | EX. 3 |
| 11 | P494 (0.02) | ADIP (0.08) | 0.082 | 0.162 | EX. 3 |
| 12 | P494 (0.015) | TERE (0.06) | 0.061 | 0.121 | EX. 3 |
| 13 | NIAX (0.02) | ISO/TER (0.06) | 0.065 | 0.125 | EX. 3 |
| 14 | MIX (0.02) | TERE (0.06) | 0.065 | 0.125 | EX. 3 |
| 15 | CARB (0.02) | TERE (0.04) | 0.045 | 0.085 | EX. 3 |
| 16 | NIAX (0.60) | TERE (1.80) | 1.95 | 3.75 | EX. 3 |
| 17 | R 45 (0.042) | TERE (0.088) | 0.095 | 0.183 | EX. 3 |
| 18 | TRI 8 (0.02) | TERE (0.06) | 0.062 | 0.125 | EX. 4 |
| 19 | P380 (0.02) | TERE (0.06) | 0.062 | 0.125 | EX. 4 |
| 20 | TET 9 (0.02) | TERE (0.08) | 0.082 | 0.162 | EX. 4 |
| 21 | NIAX (0.02) | TRIM (0.06) | 0.13 | 0.18 | EX. 3 |
| 22 | NIAX (0.02) | OXA (0.06) | 0.062 | 0.125 | EX. 4 |
| 23 | Q4 (0.06) | TERE (0.06) | 0.062 | 0.125 | EX. 4 |
| 24 | NIAX (0.03) | TERE (0.075) | 0.062 | 0.155 | EX. 3 |
| 25 | NIAX (0.03) | PPC (0.09) | 0.091 | 0.185 | EX. 3 |
| 26 | NIAX (0.03) | POC (0.09) | 0.182 | 0.272 | EX. 3 |
| 27 | NIAX (0.03) | SC (0.09) | 0.091 | 0.185 | EX. 3 |

TABLE C-continued

| Example | Polyol (Moles) | Acid Halide (Moles) | Caprolactam, Moles | TEA, Moles | Method |
|---------|----------------|---------------------|--------------------|-----------|--------|
| 28 | NIAX (0.03) | OBC (0.09) | 0.091 | 0.185 | EX. 3 |

EXAMPLES 29-51

Preparation of Nylon Block Polymers

Nylon block polymers were prepared from acyllactam functional polymers prepared in Examples 5-28 by either a hand casting polymerization method (HC) or a reaction injection molding polymerization method (RIM). These methods are described below.

A. Hand Casting of Nylon Block Polymers (Examples 29-47).

In a 500 ml. flask equipped with stirrer, thermocouple and nitrogen inlet were charged caprolactam and a prepolymer which was an acyllactam-functional polymer prepared in accordance with one of the earlier Examples 5-28. The specific prepolymer example and the amount of materials employed in each of Examples 29-47 is shown in Table D. In each case 1.5 grams of Flectol ® H (an antioxidant sold by Monsanto Company which is polymerized 1,2-dihydro-2,2,4-trimethylquinoline) was added to the charge. The mixture was heated under vacuum to distill 25 mls. caprolactam and then cooled to 75° C.

Separately prepared was a catalyst solution which was a solution of bromomagnesium caprolactam in caprolactam. The catalyst solution was generally prepared by adding a solution of 3 molar ethyl magnesium bromide in diethyl ether to dry caprolactam followed by thorough degassing under vacuum. Catalyst solutions of various molarities were prepared. For example, a 0.5 molar bromomagnesium caprolactam catalyst solution was prepared by adding 17 mls. of 3 molar ethyl magnesium bromide in diethyl ether to 100 grams of dry caprolactam with degassing as stated above. The molarity of the catalyst solution employed for specific examples is indicated in Table D.

To the above prepared prepolymer solution was injected a specified amount of catalyst solution under vacuum. The specific amount of catalyst solution employed for the Examples 29-47 is shown in Table D. After stirring vigorously for fifty seconds the vacuum was released to nitrogen and the catalyzed mixture was poured into a Teflon-lined mold heated to 130° C. After 5 to 15 minutes in the mold the resulting solid nylon block polymer was removed. The polymerization of the prepolymer and caprolactam was essentially quantitative in the formation of the nylon block polymer. Specimens were cut for testing.

TABLE D

| | | HC EXAMPLES | | | |
|---|---|---|---|---|---|
| | | Amounts - Grams | | Catalyst | |
| Example | Prepolymer Example | Prepolymer | Caprolactam | Molarity | Amt., mls. |
| 29 | 5 | 46.2 | 148 | 0.5 | 35 |
| 30 | 6 | 33.7 | 173 | 0.5 | 30 |
| 31 | 7 | 74 | 101 | 0.5 | 30 |
| 32 | 8 | 30.4 | 114 | 0.5 | 26 |
| 33 | 9 | 53.1 | 176 | 0.5 | 36 |
| 34 | 10 | 44.4 | 138 | 0.5 | 38 |
| 35* | 10 | 44.4 | 138 | 0.5 | 38 |
| 36 | 11 | 76.8 | 229 | 0.5 | 40 |
| 37 | 12 | 59.05 | 148 | 0.5 | 56 |
| 38 | 13 | 94.65 | 260 | 0.5 | 83 |
| 39 | 14 | 75.7 | 300 | 0.5 | 45 |
| 40 | 15 | 55.8 | 173 | 0.5 | 32 |
| 41 | 16 | 60 | 196 | 0.5 | 30 |
| 42 | 21 | 62 | 178 | 0.5 | 35 |
| 43 | 22 | 55 | 165 | 0.5 | 55 |
| 44 | 23 | 61 | 134 | 0.5 | 80 |
| 45 | 24 | 55.8 | 169 | 0.6 | 50 |
| 46 | 25 | 57 | 148 | 0.6 | 70 |
| 47 | 26 | 59 | 149 | 0.6 | 67 |

*Example 35 also contained 71 gms. P1117B 1/16" milled glass fiber which resulted in a 25% (wt.) glass reinforced nylon block polymer.

B. Reaction Injection Molding of Nylon Block Polymers (Examples 47-51).

In a 500 ml. flask equipped with stirrer, thermocouple and nitrogen inlet were charged caprolactam and a prepolymer which was an acyllactam functional polymer prepared in accordance with earlier Examples 5-29. The specific prepolymer example and the amount of materials employed in preparing the prepolymer solutions in each of Examples 48-51 is shown in Table E. To each charge was added 1.5 grams of Flectol ® H. The mixture was dried by heating under vacuum to distill 25 mls. caprolactam and then cooled to 75° C.

Separately a catalyst solution consisting of bromomagnesium caprolactam in caprolactam was prepared by adding a solution of 3 molar ethyl magnesium bromide in diethyl ether to dry caprolactam followed by thorough degassing under vacuum. For example, a 0.26 molar bromomagnesium caprolactam catalyst solution was prepared by adding 17 mls. of 3 molar ethyl magnesium bromide in diethyl ether to 200 grams of dry caprolactam. Catalyst solutions of varying molarities were employed in the Examples as indicated in Table E.

A reaction injection molding was made by pumping the above solutions into a closed mold heated to 130° C. Equal amounts by volume of the prepolymer solution and the catalyst solution were combined by means of gear pumping, except for Example 48 in which the prepolymer solution and catalyst solution were combined by the same means in a ratio of of 3.4:1 by volume (prepolymer solution:catalyst solution). Mixing of the combined stream prior to injection into the mold was performed by means of an in-line 6 inch by one-quarter inch Kenics static mixer. The mold was filled with the mixture and the resulting solid nylon block polymer was removed from the mold at about 2 minutes after the start of injection. The polymerization of the prepolymer and caprolactam was essentially quantitative in the formation of the nylon block polymer. Specimens were cut for testing.

TABLE E

RIM EXAMPLES

| Example | Prepolymer Example | Amounts Charge Prepolymer Solution | | Catalyst Molarity |
|---|---|---|---|---|
| | | Prepolymer (gms) | Caprolactam (gms)* | |
| 48 | 17 | 60 | 209 | 0.5 |
| 49 | 18 | 65 | 110 | 0.26 |
| 50 | 19 | 66 | 109 | 0.26 |
| 51 | 20 | 66 | 109 | 0.3 |

*Amount charged; 25 mls. was removed in drying step.

The nylon block polymers prepared either by hand casting or reaction injection molding in Examples 29–51 were tested for various properties substantially in accordance with the following procedures:

| | | |
|---|---|---|
| Tensile Strength | ASTM D1708 | [units are pounds per square inch (psi) or megapascals (MPa)]. |
| Tear Strength | ASTM D1004 | [units are pounds-force per linear inch (pli) or newtons per meter (N/m)]. |
| Flexural Modulus | ASTM D790 | [units are pounds per square inch (psi) or megapascals (MPa)]. |
| Notched Izod Impact | ASTM D256 | [units are foot-pounds per inch notch (ft./lbs./in.) or joules per meter (J/m)]. |

Test results for Examples 29–51 are provided in Table F. Tensile elongation (to break) determined in accordance with ASTM D 1708 for these nylon block polymers was generally greater than 50% and in some cases greater than 200%.

TABLE F

NYLON BLOCK POLYMER PROPERTIES

| Polymer Example | Tensile Strength | | Tear Strength | | Flexural Modulus | | Izod Impact | |
|---|---|---|---|---|---|---|---|---|
| | psi | (MPa) | pli | (N/m × $10^{-3}$) | psi × $10^{-3}$ | (MPa) | ft. lbs./in. | (J/m) |
| 29 | 6060 | (41.7) | 1660 | (291) | 200 | (1379) | 11.8 | (630) |
| 30 | 5930 | (40.8) | 1410 | (247) | 222 | (1531) | 12.0 | (641) |
| 31 | 6190 | (42.6) | | | 219 | (1510) | 11.3 | (603) |
| 32 | 6570 | (45.3) | | | 167 | (1151) | 9.4 | (502) |
| 33 | 6030 | (41.5) | | | 218 | (1503) | 8.9 | (475) |
| 34 | 6060 | (41.7) | | | 185 | (1276) | 19.9 | (1062) |
| 35* | 8060 | (55.5) | | | 334 | (2303) | 3.3 | (176) |
| 36 | 6740 | (46.4) | 1570 | (275) | 223 | (1538) | 3.6 | (192) |
| 37 | 6300 | (43.4) | 1550 | (271) | 250 | (1724) | 10.5 | (560) |
| 38 | 6020 | (41.5) | 1580 | (277) | 215 | (1482) | 11.4 | (609) |
| 39 | 6790 | (46.8) | | | 240 | (1655) | 5.1 | (272) |
| 40 | 5780 | (39.8) | | | 183 | (1262) | 2.5 | (133) |
| 41 | 6810 | (46.9) | 1240 | (217) | 213 | (1469) | 12.0 | (641) |
| 42 | 6100 | (42.0) | 1350 | (236) | 189 | (1303) | 8.0 | (427) |
| 43 | 5270 | (36.3) | 800 | (140) | 58 | (400) | 22.0 | (1174) |
| 44 | 6260 | (43.1) | 1200 | (210) | 228 | (1572) | 3.0 | (160) |
| 45 | 6520 | (44.9) | 1290 | (226) | 178 | (1227) | 12.1 | (646) |
| 46 | 5990 | (41.3) | 1430 | (250) | 211 | (1455) | 1.8 | (96) |
| 47 | 6100 | (42.0) | 1360 | (238) | 223 | (1538) | 1.8 | (96) |
| 48 | 6680 | (46.0) | 1330 | (233) | 210 | (1448) | 7.8 | (416) |
| 49 | 6530 | (45.0) | 1140 | (200) | 129 | (889) | 18.3 | (977) |
| 50 | 6950 | (47.9) | 1290 | (226) | 173 | (1193) | 19.9 | (1062) |
| 51 | 6740 | (46.4) | 1160 | (203) | 160 | (1103) | 17.6 | |

*Polymer was reinforced with 25% (wt.) P117B 1/16" milled glass fiber (Owens-Corning).

EXAMPLES 52–117

Examples 52–117 demonstrate the unexpected results exhibited by nylon block copolymers prepared from acid halide functional or acyllactam functional material containing either polyether segments having minimum molecular weights of about 2,000 or polyester segments containing polyether segments having minimum molecular weights of about 2,000.

A. Preparation Acyllactam Functional Materials

Acid halide functional materials were prepared from the polyethers listed below in Table G. The preparation of these acid halide functional materials involved preparing solutions of the desired polyether and terephthaloyl chloride in tetrahydrofuran. A sufficient quantity of an acid scavenger, triethylamine, was added to each solution, so as to precipitate out of the solutions white amine hydrochloride. The molar quantities of the particular polyether (PE) and terephthaloyl chloride (TERE) used for each solution are shown in Table H.

For each particular polyether different acid halide functional materials were prepared. In each case, acid halide functional materials containing polyether segments and acid halide functional materials containing polyester segments (comprising the polyether segment) were prepared. These polyester segments were formed by the linkage of polyether segments with terephthaloyl chloride residues. Acid halide functional materials containing polyether segments were prepared from mole ratios of 2:1 for diol derivatives and 3:1 for triol derivatives, while those materials containing polyester segments were prepared from mole ratios of 4:3 for diol derivatives and 5:2 for triol derivatives. These acid halide to polyether mole ratios are listed in the following tables under the heading AH/PE.

It should be noted that polymeric materials generally exist as mixtures or compositions containing species having varying molar amounts of polyether segments and acid halide residues. Thus, the molar ratio given pertains to the amounts of materials used to prepare each mixture and the average molar amount of acid halide residue to polyether residue found for the species formed.

Batches of acyllactam functional materials were formed by adding to each solution of acid halide functional material a solution of caprolactam and triethylamine (an acid scavenger) in tetrahydrofuran. The molar quantity of caprolactam used for each batch is shown below in Table H.

The addition of the caprolactam solution to the solution of acid halide functional material was accomplished over a period of about 7 minutes. Each solution was heated to reflux at 76° C. and maintained as such for about 1 hour. The solutions were then allowed to cool and about 100 ml. of tetrahydrofuran was added to each. Each batch was then filtered and washed with more tetrahydrofuran (about 2 washings of 75 ml.). The remaining tetrahydrofuran was then removed under vacuum at 80 C. over a period of about 3 hours.

The IR spectrum of Batch 1 showed no hydroxyl absorption but a strong ester carbonyl absorption with a weaker amide carbonyl absorption. This confirmed the preparation of the acyllactam functional material.

TABLE G

| Designation | Polyethers Description |
|---|---|
| Pluracol P1010 (P1010) | poly(oxypropylene)diol (Molec. wt. about 1,000) |
| Voranol 2010 (2010) | poly(oxypropylene)diol (Molec. wt. about 2,000) |
| PPG 3025 (PPG3025) | poly(oxypropylene)diol (Molec. wt. about 3,000) |
| PPG 4025 (PPG4025) | poly(oxypropylene)diol (Molec. wt. about 4,000) |
| Thanol SF 3950 (SF3950) | ethylene oxide capped poly(oxypropylene)diol (Molec. wt. about 3,500 with the functionality of the composition being about 2.1) |
| Voranol CP2070 (CP2070) | poly(oxypropylene)triol (Molec. wt. about 725) |
| Voranol CP1500 (CP1500) | poly(oxypropylene)triol (Molec. wt. about 1,600) |
| Pluracol GP3030 (GP) | poly(oxypropylene)triol (Molec. wt. about 3,000) |
| Niax 11-34 (NIAX) | ethylene oxide capped poly(oxypropylene)triol (Molec. wt. about 4,800) |
| Thanol SF6503 (SF6503) | ethylene oxide capped poly(oxypropylene)triol (Molec. wt. about 6,200) |
| Pluracol P-380 (P380) | ethylene oxide capped poly(oxypropylene)triol (Molec. wt. about 6,760) |

TABLE H

| Batch No. | Polyether | AH/PE | Polyether (PE) (Moles) | TERE (Moles) | Caprolactam (Moles) |
|---|---|---|---|---|---|
| 1 | P1010 | 2:1 | (0.468) | (0.936) | (0.973) |
| 2 |  | 4:3 | (0.468) | (0.624) | (0.327) |
| 3 | V2010 | 2:1 | (0.251) | (0.502) | (0.504) |
| 4 |  | 4:3 | (0.251) | (0.335) | (0.177) |
| 5 | PPG3025 | 2:1 | (0.171) | (0.342) | (0.354) |
| 6 |  | 4:3 | (0.171) | (0.228) | (0.124) |
| 7 | PPG4025 | 2:1 | (0.120) | (0.240) | (0.242) |
| 8 |  | 4:3 | (0.120) | (0.160) | (0.097) |
| 9 | SF3950 | 2:1 | (0.152) | (0.303) | (0.318) |
| 10 |  | 4:3 | (0.152) | (0.202) | (0.106) |
| 11 | CP2070 | 3:1 | (0.450) | (1.350) | (1.360) |
| 12 |  | 5:2 | (0.450) | (1.125) | (0.909) |
| 13 | CP1500 | 3:1 | (0.250) | (0.750) | (0.7575) |
| 14 |  | 5:2 | (0.250) | (0.625) | (0.555) |
| 15 | GP | 3:1 | (0.160) | (0.480) | (0.485) |
| 16 |  | 5:2 | (0.150) | (0.375) | (0.303) |
| 17 | NIAX | 3:1 | (0.11) | (0.33) | (0.333) |
| 18 |  | 5:2 | (0.179) | (0.445) | (0.361) |
| 19 | SF6503 | 3:1 | (0.08) | (0.24) | (0.2424) |
| 20 |  | 5:2 | (0.08) | (0.20) | (0.162) |
| 21 | P380 | 3:1 | (0.08) | (0.24) | (0.2424) |
| 22 |  | 5:2 | (0.08) | (0.20) | (0.162) |
| 23 |  | 3:1 | (0.06) | (0.18) | (0.1818) |

B. Preparation of Nylon Block Copolymers NBC

Nylon block copolymers were prepared by reacting each batch of acyllactam functional material with caprolactam in the presence of catalyst, caprolactam magnesium bromide. The method used for combining these materials was a reaction injection molding. This technique is well known in the art and involves directing a stream of acyllactam functional materials dissolved in caprolactam and a stream of the caprolactam magnesium bromide catalyst dissolved in caprolactam into a heated mold.

A catalyst solution was prepared for use in preparing each nylon block copolymer example, except Examples 84 and 87, by charging a 3,000 ml. flask, which was equipped with a stirrer, thermocouple-controlled heater and nitrogen inlet and a distillation head, with 1,650 grams of caprolactam. The caprolactam was dried by distilling off 50 grams of the caprolactam from the flask under a vacuum (using an oil pump to provide a vacuum under 1 mm.) at a pot temperature of 125°–130° C. The vacuum was released to a nitrogen atmosphere and the flask with the caprolactam cooled down to 75° C. All atmospheric pressure operations were performed under nitrogen. Once the caprolactam was dried, 120 ml. of a 3 molar solution of ethyl magnesium bromide in diethyl ether was added over a 10 minute period while maintaining vigorous agitation. The solution temperature was maintained at 100° C. The evolved ethane and ether were removed by degassing under a vacuum (less than 1 mm.) for an hour at 90° C. The catalyst solution was maintained at 90° C. and 200 ml. portions were drawn off for use to prepare each sample. The prepared catalyst solution had a molarity of 0.225.

Prepolymer solutions were prepared, except for Examples 84 and 87, by dissolving a prepolymer, which was an acyllactam functional material prepared in accordance with earlier Batches 1–23, in caprolactam. To each sample solution 0.5 grams of Flectol H antioxidant was added. The prepolymer solutions were dried by distilling off 25 ml. of caprolactam. The sample solutions were cooled to 85° C.

In Example No. 84, the catalyst solution was prepared according to the procedure described but using only 225 grams of caprolactam which was dried by distilling off 25 grams. Nineteen (19) ml. of a 3 molar solution grams of ethyl magnesium bromide was added to the caprolactam according to the procedure described above. The catalyst solution was then maintained at 90° C.

The acyllactam functional material of Batch No. 11 was not dissolved in caprolactam. Instead, 181 grams of acyllactam functional material was injection molded so as to obtain a 30% by weight of polyether in the final nylon block copolymer. 1.5 grams of Flectol H antioxidant was added to the acyllactam functional material prior to injection molding.

In Example No. 87, the catalyst was prepared in the same manner and quantities as described above for Example 84 with the exception that 16 ml. of a 3 molar solution of ethyl magnesium bromide was used.

Again the acyllactam solution was not dissolved in caprolactam but 159 grams of the acyllactam functional material of Batch No. 12 was used.

The specific prepolymer batch number and the amount of prepolymer and caprolactam employed in preparing the prepolymer solutions for each of Examples 52-117 is shown in Table J.

TABLE J

| Example | % Polyether in Final NBC | Prepolymer Batch No. | Amount Charge Prepolymer Solution Prepolymer (gms) | Caprolactam (gms)* |
|---|---|---|---|---|
| 52 | 10 | 1 | 43 | 132 |
| 53 | 20 | 1 | 87 | 88 |
| 54 | 30 | 1 | 130 | 45 |
| 55 | 10 | 2 | 37 | 138 |
| 56 | 20 | 2 | 74 | 101 |
| 57 | 30 | 2 | 111 | 64 |
| 58 | 10 | 3 | 38 | 138 |
| 59 | 20 | 3 | 75 | 100 |
| 60 | 30 | 3 | 113 | 63 |
| 61 | 10 | 4 | 34 | 141 |
| 62 | 20 | 4 | 68 | 107 |
| 63 | 30 | 4 | 102 | 73 |
| 64 | 10 | 5 | 35 | 140 |
| 65 | 20 | 5 | 70 | 105 |
| 66 | 30 | 5 | 105 | 70 |
| 67 | 10 | 6 | 33 | 142 |
| 68 | 20 | 6 | 65 | 110 |
| 69 | 30 | 6 | 98 | 77 |
| 70 | 10 | 7 | 33 | 142 |
| 71 | 20 | 7 | 67 | 108 |
| 72 | 30 | 7 | 100 | 75 |
| 73 | 10 | 8 | 32 | 143 |
| 74 | 20 | 8 | 64 | 111 |
| 75 | 30 | 8 | 96 | 79 |
| 76 | 10 | 9 | 34 | 141 |
| 77 | 20 | 9 | 68 | 107 |
| 78 | 30 | 9 | 102 | 73 |
| 79 | 10 | 10 | 32 | 143 |
| 80 | 20 | 10 | 65 | 110 |
| 81 | 30 | 10 | 97 | 78 |
| 82 | 10 | 11 | 60 | 115 |
| 83 | 20 | 11 | 121 | 54 |
| 84 | 30 | 11 | 181 | — |
| 85 | 10 | 12 | 53 | 122 |
| 86 | 20 | 12 | 106 | 69 |
| 87 | 30 | 12 | 159 | — |
| 88 | 10 | 13 | 43 | 132 |
| 89 | 20 | 13 | 87 | 88 |
| 90 | 30 | 13 | 130 | 45 |
| 91 | 10 | 14 | 41 | 134 |
| 92 | 20 | 14 | 81 | 94 |
| 93 | 30 | 14 | 122 | 53 |
| 94 | 10 | 15 | 38 | 138 |
| 95 | 20 | 15 | 75 | 100 |
| 96 | 30 | 15 | 113 | 63 |
| 97 | 10 | 16 | 36 | 139 |
| 98 | 20 | 16 | 71 | 104 |
| 99 | 30 | 16 | 107 | 68 |
| 100 | 10 | 17 | 34 | 141 |
| 101 | 20 | 17 | 69 | 106 |
| 102 | 30 | 17 | 103 | 72 |
| 103 | 10 | 18 | 33 | 142 |
| 104 | 20 | 18 | 67 | 108 |
| 105 | 30 | 18 | 100 | 75 |
| 106 | 10 | 19 | 34 | 141 |
| 107 | 20 | 19 | 67 | 108 |
| 108 | 30 | 19 | 101 | 74 |
| 109 | 10 | 20 | 33 | 142 |
| 110 | 20 | 20 | 65 | 110 |
| 111 | 30 | 20 | 98 | 77 |
| 112 | 10 | 21 | 33 | 142 |
| 113 | 20 | 23 | 67 | 108 |
| 114 | 30 | 23 | 100 | 75 |
| 115 | 10 | 22 | 32 | 143 |
| 116 | 20 | 22 | 65 | 110 |
| 117 | 30 | 22 | 97 | 78 |

*Amount charged; 25 ml. was removed in drying step.

The nylon block copolymers in Examples 52-83, 86, and 88-117 were prepared by pumping the prepolymer solutions and the catalyst solution in a 1:1 stream volume ratio into a closed mold heated to 140° C. having an internal cavity of 20.32 cm.×20.32 cm.×3.175 cm. Examples 84 and 87 were prepared by pumping the prepolymer and catalyst solution in a 1.52:1 and 1.13:1 stream volume ratio, respectively, into a similar mold. Mixing of the combined streams prior to injection into the mold was performed by means of an in-line 4 inch to one-quarter inch Kenics static mixer. Examples 52-117 were then tested to determine their impact and flexibility properties substantially in accordance with the following procedures: Flexural Modulus, Notched Izod Impact (which were described above) and Driven Dart: Procedure described in November 1974 SPE Retec Bulletin by V. A. Matonis-15.88 mm.(5/8 in.) diameter Dart driven at 111.76 m./min. (4400 in./min.) impacted against a 3.2 mm. (⅛ in.) by 50.8 mm. (2 in.) diameter disc of the specific NBC which was held against a 31.75 mm. (1¼ in.) sample ring at a temperature −29° C. (−20° F.). Energy measurements made with a Nicolet 1094 Digital Oscilloscope [units are joules (J) or inches per pounds (in.-lbs.)]

The test results are provided in Tables (K-1)–(K-4) below. The examples are arranged according to polyether type (either diol or triol derivatives), percent by weight of polyether in the nylon block copolymer, and by the AH/PE ratio to highlight the effect of molecular weight upon impact properties.

TABLE K-1

| Example No. | Flexural Modulus MPa (psi × 10⁻³) | | Izod Impact J/m (ft.-lbs./in.) | | Driven Dart J (in./lbs.) | |
|---|---|---|---|---|---|---|
| Diol Derivatives 2:1 AH/PE Ratio | | | | | | |
| 10% Polyether | | | | | | |
| 52 | 2268 | (329) | 21 | (0.4) | 0.3 | (2.6) |
| 58 | 1517 | (220) | 64 | (1.2) | 2.1 | (18.7) |
| 64 | 1972 | (286) | 69 | (1.3) | 0.9 | (7.9) |
| 70 | 2462 | (357) | 91 | (1.7) | — | — |
| 76 | 1855 | (269) | 133 | (2.5) | 8.3 | (75.0) |
| 20% Polyether | | | | | | |
| 53 | 1069 | (155) | 16 | (0.3) | 0.1 | (1.1) |
| 59 | 1172 | (170) | 155 | (2.9) | 2.7 | (24.6) |
| 65 | 1482 | (215) | 133 | (2.5) | 1.8 | (16.4) |
| 71 | 979 | (142) | 294 | (5.5) | 2.6 | (23.6) |
| 77 | 1248 | (181) | 731 | (13.7) | 13.7 | (123.1) |
| 30% Polyether | | | | | | |
| 54 | 310 | (45) | 16 | (0.3) | ¼.01 | (0.5) |
| 60 | 1220 | (177) | 475 | (8.9) | 7.9 | (70.8) |
| 66 | 614 | (89) | 502 | (9.4) | 8.5 | (76.1) |
| 72 | 455 | (66) | 384 | (7.2) | 12.1 | (109.0) |
| 78 | 545 | (79) | 598 | (11.2) | 52.3 | (470.2) |

TABLE K-2

| Example No. | Flexural Modulus MPa (psi) × 10⁻³ | | Izod Impact J/m (ft.-lbs. in.) | | Driven Dart J (in./lbs.) | |
|---|---|---|---|---|---|---|
| Triol Derivatives 3:1 AH/PE Ratio | | | | | | |
| 10% Polyether | | | | | | |
| 82 | 2165 | (314) | 16 | (0.3) | 0.1 | (1.2) |
| 88 | 2144 | (311) | 75 | (1.4) | 0.6 | (5.5) |
| 94 | 1889 | (274) | 80 | (1.5) | 2.9 | (26.1) |
| 100 | 1441 | (209) | 155 | (2.9) | 8.4 | (75.7) |
| 106 | 1717 | (249) | 342 | (6.4) | 19.1 | (172.0) |
| 112 | 1703 | (247) | 352 | (6.6) | 8.2 | (73.9) |
| 20% Polyether | | | | | | |
| 83 | 331 | (48) | 5 | (0.1) | ¼.1 | (0.1) |
| 89 | 924 | (134) | 48 | (0.9) | 0.1 | (2.1) |

TABLE K-2-continued

| Example No. | Flexural Modulus MPa (psi) × 10$^{-3}$ | | Izod Impact J/m (ft.-lbs. in.) | | Driven Dart J (in./lbs.) | |
|---|---|---|---|---|---|---|
| 95 | 1331 | (193) | 774 | (14.5) | 23.8 | (214.0) |
| 101 | 1020 | (148) | 961 | (18.0) | 59.2 | (531.8) |
| 107 | 1096 | (159) | 838 | (15.7) | 30.7 | (275.4) |
| 113A | 745 | (108) | 715 | (13.4) | 55.7 | (500.3) |
| 113B | 731 | (106) | | | 34.4 | (308.8) |
| 30% Polyether | | | | | | |
| 84 | | | (Poor Reactivity) | | | |
| 90 | 407 | (59) | 165 | (3.1) | 0.1 | (0.8) |
| 96 | 414 | (60) | 630 | (11.8) | 20.5 | (184.1) |
| 102 | 415 | (60.2) | 667 | (12.5) | 22.3 | (200.3) |
| 108 | 421 | (61) | 619 | (11.6) | 26.7 | (239.9) |
| 114 | 393 | (57) | 582 | (10.9) | 26.3 | (236.2) |

TABLE K-3

| Example No. | Flexural Modulus MPa (psi × 10$^{-3}$) | | Izod Impact J/m (ft.-lbs/in.) | | Driven Dart J (in./lbs.) | |
|---|---|---|---|---|---|---|
| Diol Derivatives 4.3 AH/PE Ratio | | | | | | |
| 10% Polyether | | | | | | |
| 55 | 1848 | (268) | 48 | (0.9) | 2.3 | (20.5) |
| 61 | 2517 | (365) | 48 | (0.9) | — | — |
| 67 | 2213 | (321) | 59 | (1.1) | — | — |
| 73 | 779 | (113) | 32 | (0.6) | — | — |
| 79 | 1951 | (283) | 64 | (1.2) | 1.3 | (12.0) |
| 20% Polyether | | | | | | |
| 56 | 1254 | (182) | 101 | (1.9) | 2.4 | (21.8) |
| 62 | 1282 | (186) | 107 | (2.0) | 5.9 | (53.1) |
| 68 | 1400 | (203) | 160 | (3.0) | 16.9 | (151.9) |
| 74 | 1034 | (149) | 214 | (4.0) | 9.6 | (86.3) |
| 80 | 1220 | (177) | 657 | (12.3) | 29.6 | (266.1) |
| 30% Polyether | | | | | | |
| 57 | 752 | (109) | 128 | (2.4) | 2.1 | (18.9) |
| 63 | 703 | (102) | 673 | (12.6) | 23.0 | (207.0) |
| 69 | 1069 | (155) | 731 | (13.7) | 34.5 | (310.0) |
| 75 | 455 | (66) | 139 | (2.6) | 6.2 | (55.7) |
| 81 | 421 | (61) | 432 | (8.1) | 36.4 | (327.2) |

TABLE K-4

| Example No. | Flexural Modulus MPa (psi × 10$^{-3}$) | | Izod Impact J/m (ft.-lbs/in.) | | Driven Dart J (in./lbs.) | |
|---|---|---|---|---|---|---|
| Triol Derivatives 5:2 AH/PE Ratio | | | | | | |
| 10% Polyether | | | | | | |
| 85 | 2082 | (302) | 48 | (0.9) | 2.4 | (2.1) |
| 91 | 1641 | (238) | 101 | (1.9) | 2.7 | (24.0) |
| 97 | 1531 | (222) | 96 | (1.8) | 4.0 | (35.8) |
| 103 | 2006 | (291) | 96 | (1.8) | 3.1 | (28.3) |
| 109 | 1696 | (246) | 246 | (4.6) | 10.6 | (95.6) |
| 115 | 1607 | (233) | 128 | (2.4) | 4.0 | (35.5) |
| 20% Polyether | | | | | | |
| 86 | 565 | (82) | 11 | (0.2) | .01 | (0.7) |
| 92 | 1103 | (160) | 256 | (4.8) | .05 | (4.3) |
| 98 | 1227 | (178) | 230 | (4.3) | 10.8 | (96.9) |
| 104 | 1145 | (166) | 731 | (13.7) | 34.2 | (307.2) |
| 110 | 1041 | (151) | 747 | (14.0) | 50.1 | (449.9) |
| 116 | 1207 | (175) | 747 | (14.0) | 29.3 | (236.4) |
| 30% Polyether | | | | | | |
| 87 | 283 | (41) | 21 | (0.4) | ⅟.01 | (0.4) |
| 93 | 452 | (65.5) | 470 | (8.8) | 0.6 | (5.0) |
| 99 | 556 | (80.6) | 785 | (14.7) | 19.1 | (171.5) |
| 105 | 607 | (88) | 689 | (12.9) | 23.6 | (212.4) |
| 111 | 503 | (73) | 662 | (12.4) | 31.7 | (285.0) |
| 117 | 448 | (65) | 523 | (9.8) | 28.2 | (253.5) |

As indicated in Table (K-1)–(K-4), the impact property test results, i.e. Izod Impact and Driven Dart, of nylon block copolymers containing polyether segments or polyester segments having polyether segments exhibit unexpected results when the polyether segments have a minimum molecular weight of about 2,000. For example, see Examples 52–57 and 82–87 which contained polyether segments with molecular weights of 1,000 and 725, respectively, exhibited significantly lower impact properties than the remaining examples wherein the molecular weights were at about 2,000 or more. Examples 89–90 and 91–93 exhibited better impact properties and were prepared from polyether segments derived from triols having a minimum molecular weight of about 1,600 which is within the preferred minimum molecular weight of about 2,000. The effect is more apparent at polyether contents greater than 10 weight percent of the nylon block copolymer, most likely due to the greater influence of the polyamide segments than the polyether segments at such low levels of polyether in the nylon block copolymer.

Furthermore, as indicated in Table K, the impact property test results of nylon block copolymers containing polyether segments and polyester segments having polyether segments, exhibit unexpected results when the polyethers were derived from triols as compared diols, see Examples 94–96 and 97–99 for triol derivatives and Examples 64–66 and 67–69 for diol derivatives. Both the triols and diols utilized had molecular weights of about 3,000.

Also as stated above, a minimum amount of cross-linking in the composition results in better properties. This is seen by comparing the impact properties of those nylon block copolymers prepared from PPG 4025 (Examples 70–72 and 73–75) with those prepared from Thanol SF 3950 (Examples 76–78 and 79–81). Thanol SF 3950 was a composition having a functionality of about 2.1, thus allowing for some minimal cross-linking. It should be noted that while the Examples demonstrate polyethers having a functionality greater than two, this association of functionality and improved impact would also be applicable for polysiloxanes and hydrocarbons.

EXAMPLES 118–122

Examples 118–122 were prepared to demonstrate the effect of specific R groups had upon impact and other properties of nylon block copolymers made from prepolymers containing such R groups hereinabove described (see Formula I(a)).

As discussed above, preferred R groups are hydrocarbon groups and hydrocarbon groups having ether linkages which provide at least three successively bonded elementary atoms between any two carbonyl groups bonded to R. Acyllactam functional materials were made by reacting a polyether (NIAX) with various acid halides, as specified in Table L below. Some of the acid halides used (i.e. o-phthalic acid chloride and fumaric acid chloride) formed R groups that provided less than 3 successively bonded elementary atoms between the two carbonyl groups. The remaining halides formed R groups providing 3 or more successively bonded atoms between 2 carbonyl groups. The resulting acid halide functional materials were then reacted with caprolactam (the specific process of preparing these materials is similar to the process described hereinabove and will not be discussed in detail herein) to form acyllactam functional materials. These acyllactam functional materials were blended into caprolactam and then reacted with a catalyst-caprolactam solution (prepared according to a process similar to the process described above) to form nylon block copolymers having 20 weight percent polyether content. The resulting nylon block copolymers were subjected to the following tests: Driven Dart (described above) and
Acetone Extractables: Percent weight loss after 24 hours in a Soxklet Extractor.

TABLE L

| Example No. | Acid Halide | Driven Dart J (in./lbs.) | Acetone Extractable (%) |
|---|---|---|---|
| 118 | m-phthalic acid chloride | (316.7) | 1.64 |
| 119 | p-phthalic acid chloride | (141.1) | 1.76 |
| 120 | o-phthalic acid chloride | (1.8) | 3.38 |
| 121 | sebacic acid chloride | (315.2) | 1.71 |
| 122 | fumaric acid chloride | (1.1) | 34.0 |

As seen from Table L, the impact properties (Driven Dart) of a nylon block copolymer are improved when the R group provides at least three successively bonded atoms between any two carbonyl groups bonded to the R group, see Examples 118, 119, and 121.

While the preferred embodiments of the present invention have been described and illustrated, various modifications or substitutions can be made thereto without departing from the spirit and scope of the invention. Accordingly, it is to be understood that the present invention has been described by way of illustration and not limitation.

What is claimed is:

1. An acid halide functional material of the formula:

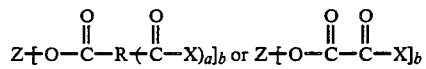

wherein:
X is a halogen;
a is an integer equal to 1, 2, or 3;
b is an integer greater than 2;
R is a di- or a poly- valent group selected from hydrocarbon groups and hydrocarbon groups containing ether linkages; and
Z is a segemnt of: (1) a hydrocarbon having a molecular weight of about 500 to about 4000; or (2) a polyester containing polymeric hydrocarbon segments having molecular weights of about 500 to about 4000.

2. The material of claim 1 wherein said acid halide functional material consists of:

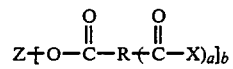

3. The material of claim 2 wherein R provides for at least three successively bonded elementary atoms between any two carbonyl groups bonded to R.

4. The material of claim 3 wherein R provides from about four to about eight successively bonded elementary atoms between any two carbonyl groups bonded to R.

5. The material of claim 4 wherein R is derived from an acid halide selected from the group consisting of adipoyl chloride, terephthaloyl chloride, isophthaloyl chloride, sebacic acid chloride, and azelaic acid chloride.

6. The material of claim 2 wherein said polymeric hydrocarbon segements of said polyester segment comprises polybutadiene.

7. The material of claim 3 wherein said polymeric hydrocarbon segments of said polyester segment comprises polybutadiene.

8. The material of claim 2 wherein b is from three to four.

9. The material of claim 2 wherein X is chlorine or bromine.

10. The material of claim 3 wherein X is chlorine or bromine.

11. The material of claim 4 wherein R is derived from an acid halide selected from the group consisting of adipoyl chloride, terephthaloyl chloride, trimesoyl chloride, trimellitic chloride, isophthaloyl chloride, pyromellitoyl chloride, pimeloyl chloride, glutaryl chloride, benzophenone tetracarboxylic acid chloride, oxydiacetyl chloride, oxydibenzoyl chloride, sebacic acid chloride and azelaic acid chloride.

12. The material of claim 11 wherein X is chlorine or bromine.

13. The material of claim 2 wherein X is chlorine.

14. The material of claim 3 wherein X is chlorine.

15. The material of claim 11 wherein X is chlorine.

* * * * *